(No Model.)  2 Sheets—Sheet 1.

S. C. SCHOFIELD.
POTATO PLANTER AND FERTILIZER DISTRIBUTER.

No. 552,147. Patented Dec. 31, 1895.

Witnesses:
Charles O. Hervey
A. H. Ebbesen

Inventor:
Silas C. Schofield
by
Wilds, Greene & Bitner
Attorneys

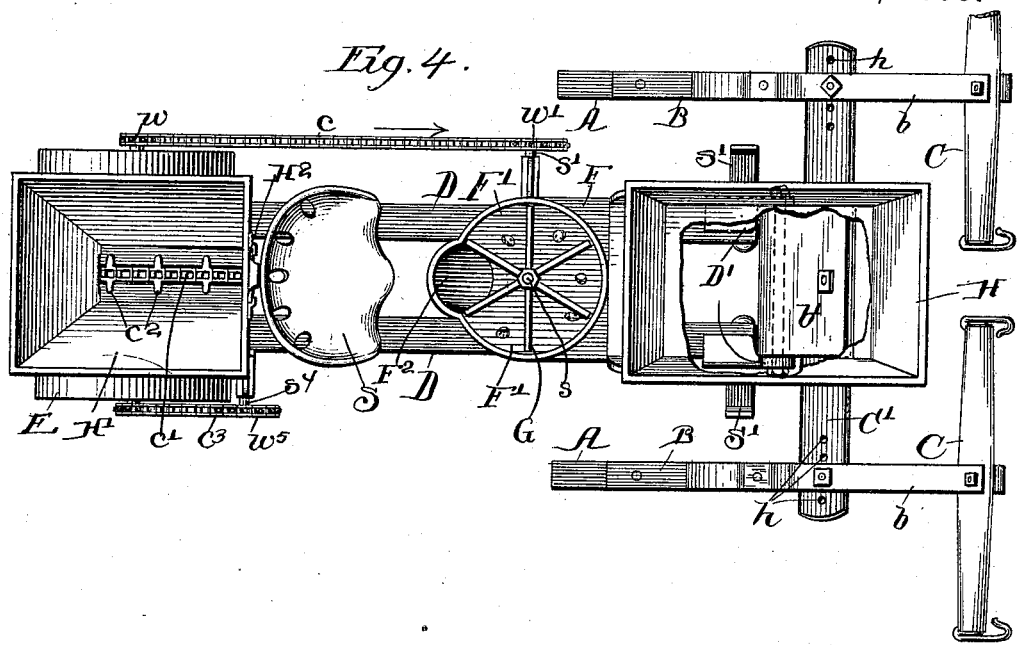
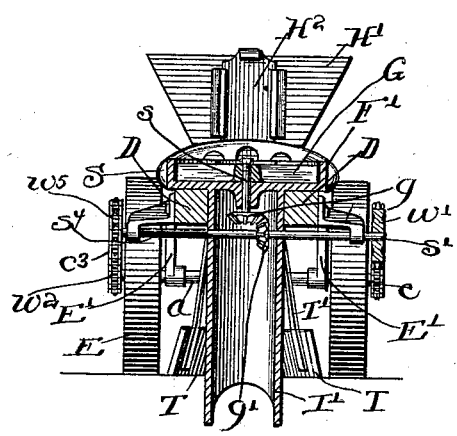
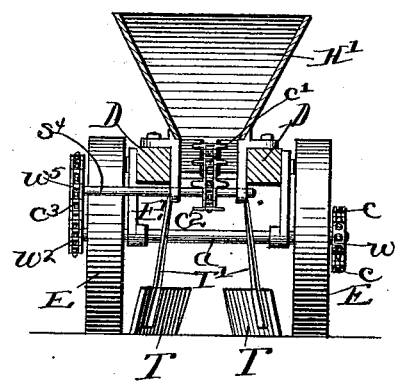

UNITED STATES PATENT OFFICE.

SILAS C. SCHOFIELD, OF FREEPORT, ILLINOIS.

POTATO-PLANTER AND FERTILIZER-DISTRIBUTER.

SPECIFICATION forming part of Letters Patent No. 552,147, dated December 31, 1895.

Application filed February 7, 1894. Serial No. 499,319. (No model.)

*To all whom it may concern:*

Be it known that I, SILAS C. SCHOFIELD, a citizen of the United States of America, residing at Freeport, in the county of Stephenson and State of Illinois, have invented certain new and useful Improvements in Potato-Planters and Fertilizer-Distributers, of which the following is a specification.

My invention relates to improvements in combined potato-planters and fertilizer-distributers, the machine embodying my invention being adapted to form a furrow, drop the seed-potatoes in it at predetermined intervals, deposit a suitable fertilizer in the furrow, and fill the furrow with earth, thereby covering the seed-potatoes and the fertilizer.

The invention is fully described and explained in this specification and shown in the accompanying drawings, in which—

Figure 1:
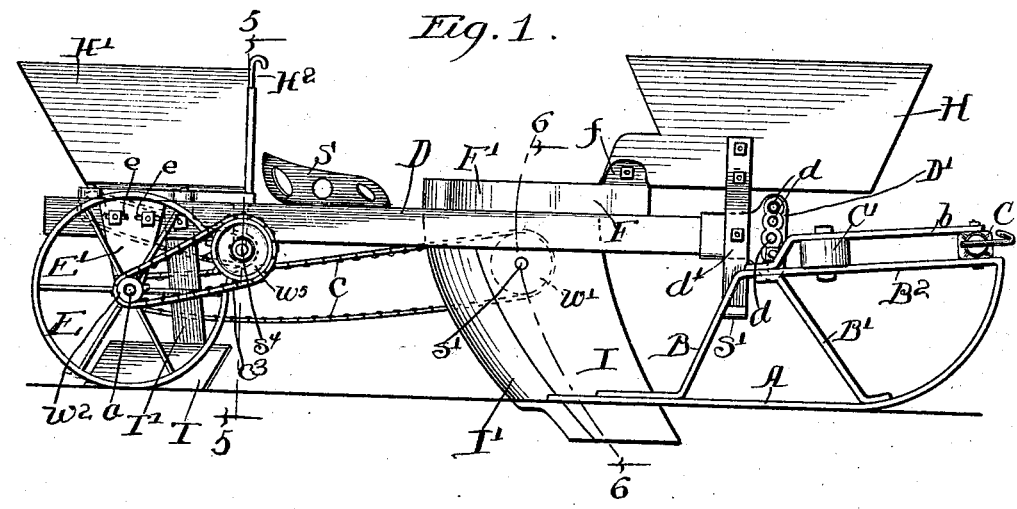
Figure 2:
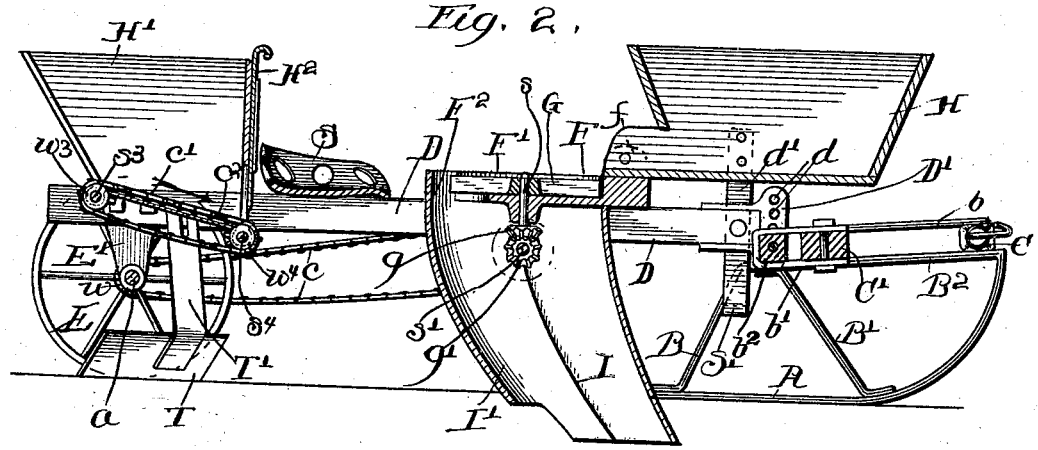
Figure 3:
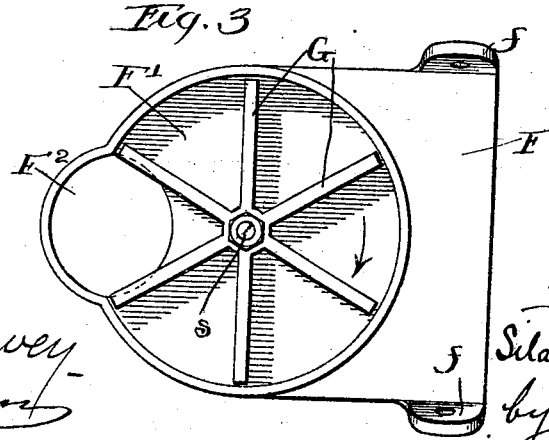

Figure 1 is a side elevation of a machine embodying my improvements. Fig. 2 is a longitudinal vertical section of the machine. Fig. 3 is a top plan of the seed-distributing mechanism. Fig. 4 is a top plan of the entire machine. Fig. 5 is a transverse vertical section through the line 5 5, Fig. 1, and Fig. 6 is a similar view through the line 6 6, Fig. 1, the view in Figs. 5 and 6 being in the direction indicated by the arrows in Fig. 1.

In these views, A A are two light runners of suitable form strengthened by braces B B' B², each of the runners and its two braces B B² being preferably formed from a single strip of sheet metal, and its brace B' being formed from a second strip of the same material, the whole runner thus formed being extremely light and strong. Above the horizontal braces B² of the two runners are strips b b. Parallel to said braces and between the front end of each of said strips and the brace immediately beneath it is fastened a whiffletree C for the attachment of a horse. The two runners are joined by a transverse bar C', each of whose ends lies between the rear end of the corresponding strip b and the brace B² beneath it, the ends of the bar being each formed with a series of holes h for the purpose of varying the distance between the runners. At the center of the bar C' is a rearwardly-extending loop b' inclosing a block b², and this block and the rear end of the loop lie between two parallel vertical clevis-plates D' D', rigidly fastened to the front ends of two parallel approximately horizontal beams D D, forming the main frame of the machine. The clevis-plates D' are formed with corresponding holes d d, by means of which the height of the front ends of the beams may be regulated for the purpose of raising or lowering the mechanism carried by the frame and hereinafter described. The rear ends of the beams D D are supported by wheels E E mounted on an axle a, which is journaled in two brackets E' E', fastened to the beams, as shown in Figs. 1 and 2, the brackets being formed with horizontal slots e e, so that they may be adjusted longitudinally upon the beams for the purpose hereinafter mentioned.

On the front ends of the beams D D is mounted a hopper H, intended to receive seed-potatoes for planting, the principal support of the hopper being two braces d' d' of strip-iron fastened to the hopper and to the beams. The rear end of the hopper, however, lies between two ears f f, formed on a plate F, which rests upon and is fastened to the beams at a point immediately in rear of the hopper H. The greater part of the area of the plate F is made up of a shallow pan F', having at its rear margin an opening F², and in this pan lies a rotating spider G, formed with a suitable number of radial arms and mounted on a central spindle s, which extends downward through the bottom of the pan in the manner shown in Fig. 2. On the lower end of the spindle s is mounted a miter-gear g, engaging a second miter-gear g' on a transverse horizontal shaft s'. (Clearly shown in Figs. 2 and 6.) On one end of the shaft s' is mounted a sprocket-wheel w', which is connected by a chain c with a sprocket-wheel w on the axle a of the wheels E E at the rear of the machine. It is evident that as the machine moves forward the rotation of its axle must be communicated through the chain c, sprocket-wheels w w', and gears g g' to the spider G, which will thereby be turned at a speed dependent upon the speed of the machine and the proportions of the gearing. If seed-potatoes be placed in the spaces between the radial arms of the spider G, the rotation of the spider must drop them at regular intervals through the opening F² in the bottom of the pan F'. In order to vary the intervals at which the potatoes are dropped I provide the machine with sprocket-wheels of different diameters, any of which may be applied to the shaft $s'$, and thereby increase or decrease the speed of rotation of the spider, the adjustment of the brackets E' E' already referred to being sufficient to take up any slack in the chain $c$ caused by the change of diameter of the sprocket-wheel upon the shaft $s'$.

Immediately below the pan F' is a furrow-opener and delivery-spout made up of two overlapping parts I I', preferably of cast metal, the front member I being of such shape as to readily open a furrow and the rear member I' being simply a guide for the potatoes dropped through the opening in the bottom of the pan above. The raising and lowering of the furrow-opener for the purpose of varying the depth of the furrow is accomplished by raising or lowering the front ends of the beam by means of the clevis-plates D', as already described. The beams D D are provided with an operator's seat S in rear of the dropping mechanism, and the braces $d'$ $d'$ of the hopper H extend downward and are formed into stirrups S' S' to receive the feet of the operator. In use, the hopper H is supplied with potatoes which may be reached by the operator at the opening in the rear wall of the hopper shown in Fig. 2. The operator places them in the spaces between the radial arms of the spider G, and the rotation of the spider drops them through the opening $F^2$ and the delivery-spout below, and they fall at regular intervals into the furrow formed by the furrow-opener.

On the rear ends of the beams D D is mounted a hopper H', adapted to receive a suitable fertilizer and having in its front end an opening which may be varied at will by means of a vertically-moving gate $H^2$, Figs. 1, 2, and 6. At the rear and front ends, respectively, of the base of the hopper H' are sprocket-wheels $w^3$ $w^4$, mounted on horizontal shafts $s^3$ $s^4$, and a chain $c'$, provided at suitable intervals with transverse scraping-links $c^2$, extends about these sprocket-wheels, its upper fold resting upon the base of the hopper on a line midway between its edges. The bottom of the hopper is preferably formed with a groove to receive the body of the chain, the transverse scraping-links only being above the upper surface of the bottom. On the end of the shaft $s^4$ is mounted a sprocket-wheel $w^5$, Figs. 1 and 4, and a chain $c^3$ connects this sprocket-wheel with a sprocket-wheel $w^2$ on the axle $a$, the rotation of the axle being communicated through this chain to the chain $c'$, which is thereby moved in the direction indicated by the arrow upon it in Fig. 2, thus carrying the fertilizer forward through the opening in the front wall of the hopper H' and dropping it in a regular and continuous stream into the furrow.

Oblique scrapers T T lie between and slightly in front of the wheels E E, and are held in place by standards T' T', fastened to the beams D D, the upper ends of the standards being longitudinally slotted to permit vertical adjustment of the scrapers. These scrapers have the usual function of drawing the loose earth from the sides of the furrow and filling and smoothing the furrow after the potatoes and the fertilizer have been dropped into it.

In practice, I have found that as the potatoes are dropped into the furrow they are slightly covered by loose earth falling into the furrow immediately behind the furrow-opener, the fertilizer being dropped upon this partial covering of earth and being, in turn, covered by the remaining earth drawn into the furrow by the scrapers T T. This is exactly the most advantageous order of operation of the machine, since it is undoubtedly best to separate the fertilizer from the seed-potatoes by a light layer of earth and then cover the fertilizer with a heavier layer, the fertilizer being thus near the potatoes, but not in contact with them.

The distance between the contiguous furrows formed by the machine may easily be regulated by using the track made by one of the runners in making each furrow as a guide for the same runner in making the next furrow. The distance between the furrows may be varied by changing the distance between the runners in the manner suggested in the description of the transverse beam C' and its connection with the runners.

Having now described and explained my invention, what I claim as new, and desire to secure by Letters Patent, is—

1. In a machine of the class described, the combination with a main frame, and means for supporting its rear end, of a transverse bar supporting the front end of said frame, runners supporting the ends of said bar, a hopper mounted on the front end of the frame, a furrow opener and dropping guide dependent from the frame at a point in rear of said hopper and means for vertically adjusting the front end of the frame and thereby raising or lowering said furrow opener for the purpose of varying the depth of the furrow formed thereby; substantially as shown and described.

2. The combination with the beams, D, D, and suitable supports for their rear ends, of the transverse bar, C', the runners supporting the ends of said transverse bar and the clevis plates, D', D', fastened to the ends of the beams, D, D, and adapted to be adjustably connected with the transverse bar, C'.

3. The combination with the beams, D, D, and means for supporting their rear ends, of the runners, A, A, having braces, B, B', $B^2$, and strips, $b$, the transverse bar, C', supported by the braces, $B^2$, $B^2$, of the runners and held in place by the strips, $b$, $b$, the loop, $b'$, extending backward from the transverse bar, C', and the clevis plates, D', D', fastened to the front ends of the beams, D, D, and lying on opposite sides of the loop, $b'$, the clevis plates being formed with holes for adjustably fastening them to said loop; substantially as shown and described.

4. The combination with the main frame and the supports for its front end, of the axle, $a$, and wheels, E, E, supporting its rear end, the hopper, H, and pan, F', supported on the frame, the spider, G, lying in the pan and having a vertical shaft, $s$, the horizontal shaft, $s'$, the gears, $g$, $g'$, connecting the shafts, $s$, $s'$, and the chain, $c$, connecting the shaft, $s'$, with the axle, $a$; substantially as shown and described.

SILAS C. SCHOFIELD.

Witnesses:
J. W. SANDERSON,
S. A. BUCKMAN.